US012663149B1

(12) United States Patent
Pu

(10) Patent No.: US 12,663,149 B1
(45) Date of Patent: Jun. 23, 2026

(54) LAMP SHELL AND LAMP

(71) Applicant: Gaatu, Inc., Tracy, CA (US)

(72) Inventor: Yubin Pu, Tracy, CA (US)

(73) Assignee: GAATU, INC., Tracy, CA (US)

( * ) Notice: Subject to any disclaimer, the term of this patent is extended or adjusted under 35 U.S.C. 154(b) by 0 days.

(21) Appl. No.: 19/185,679

(22) Filed: Apr. 22, 2025

(51) Int. Cl.
*F21V 31/00* (2006.01)
*F21V 15/01* (2006.01)
*F21V 23/00* (2015.01)

(52) U.S. Cl.
CPC ............ *F21V 31/005* (2013.01); *F21V 15/01* (2013.01); *F21V 23/002* (2013.01)

(58) Field of Classification Search
CPC ....... F21V 31/005; F21V 15/01; F21V 23/002
See application file for complete search history.

(56) References Cited

U.S. PATENT DOCUMENTS 11,629,833 B1 * 4/2023 Wu ......................... F21S 43/26 362/511
11,953,162 B1 * 4/2024 Zhao ....................... F21K 9/238
2005/0207176 A1 * 9/2005 Johnson ............... B60Q 1/2696 362/545
2008/0143234 A1 * 6/2008 Yu ........................... F21V 17/06 313/318.09
2008/0247187 A1 * 10/2008 Kolstee ................ B60Q 1/2615 362/545
2023/0324037 A1 * 10/2023 Zhang ..................... F21V 19/04 362/296.01

* cited by examiner

*Primary Examiner* — Leah Macchiarolo
(74) *Attorney, Agent, or Firm* — CANTOR COLBURN LLP

(57) ABSTRACT

The present application provides a lamp shell, which relates to the technical field of lighting devices. The lamp shell includes a shell and a waterproof plug, the shell is provided with a wire-passing channel, the waterproof plug is inserted and fixed in the wire-passing channel, the waterproof plug is provided with a wire-passing hole for interference fit with the wire, and the wire-passing hole is provided with a notch. The housing in the lamp shell of the present application is provided with a wire-passing channel, a waterproof plug is inserted and fixed in the wire-passing channel, the wire-passing hole is located on the waterproof plug and is provided with a notch, and the wire-passing hole has a larger elastic deformation space by arranging the notch to facilitate the installation of the wires.

16 Claims, 3 Drawing Sheets

LAMP SHELL AND LAMP

TECHNICAL FIELD

The present application relates to the technical field of lighting devices, and more particularly to a lamp shell and a lamp.

BACKGROUND

As a new type of lighting source, LED lamps have the advantages of energy saving, environmental friendliness and high brightness, and are widely used in daily life. The wire outlets of lamps generally adopts sealing rings or sealants to achieve a certain degree of waterproof performance. However, during transportation and installation, the lamp wires are likely to be pulled laterally or the sealing rings or sealants are aged and cracked after a period of use, resulting in gaps between the wires and the sealing rings or sealants, and the sealing structure is damaged and non-waterproof.

SUMMARY

An objective of embodiments of the present application is to provide a lamp shell and a lamp to solve the technical problem that the sealing structure of the lamp shell is easily damaged and the waterproof performance is poor in the prior art.

In order to achieve the above objective, the technical solution adopted by the present application is to provide a lamp shell, which includes a housing and a waterproof plug, the housing is provided with a wire-passing channel, the waterproof plug is plugged and fixed in the wire-passing channel, the waterproof plug is provided with a wire-passing hole for interference fit with the wire, and the wire-passing hole is provided with a notch.

Optionally, the waterproof plug is provided with a protruding edge, an inner wall of the wire-passing channel is provided with a boss, and the protruding edge is lapped at an inner side end of the boss.

Optionally, the inner side end of the boss is provided with a guide slope, and an angle formed between the guide slope and an axis of the wire-passing channel is ranged from 30° to 60°.

Optionally, a width of the notch is not greater than ⅓ of a diameter of the wire-passing hole.

Optionally, a wall surface of the wire-passing channel and an end surface of the waterproof plug form a receiving slot, two receiving slots are provided, and at least one of the receiving slots is provided with a waterproof seal.

Optionally, an inner wall of the housing is provided with a support platform, the wire-passing channel passes through the support platform, and an outer wall of the support platform is tapered.

Optionally, an angle formed between the outer wall of the support platform and an axis of the wire-passing channel is ranged from 1° to 5°.

Optionally, a height of the waterproof plug is ranged from 1 mm to 30 mm.

Optionally, the waterproof plug is a silicone member or a rubber member.

The present application further provides a lamp, which includes a lamp body and the lamp shell mentioned above, the lamp body is installed in the housing, and the wire of the lamp body is located in the wire-passing hole.

The benefits of the lamp shell provided by the present application are that: compared with the prior art, the housing in the lamp shell of the present application is provided with a wire-passing channel, a waterproof plug is inserted and fixed in the wire-passing channel, the wire-passing hole is located on the waterproof plug and is provided with a notch, and the wire-passing hole has a larger elastic deformation space by arranging the notch to facilitate the installation of the wires. Moreover, during the process of installing the waterproof plug into the wire-passing channel, the notch is compressed, so that the waterproof plug can better adapt to the size deviation of the wire-passing channel and ensure a tight fit: after being installed in place, the waterproof plug is compressed, and a greater rebound force is generated by means of the notch, so that the gap between the outer wall of the waterproof plug and the inner wall of the wire-passing channel can be more tightly filled to prevent the ingress of water, dust, etc., therefore the sealing effect of the waterproof plug is improved.

DESCRIPTION OF THE DRAWINGS

In order to explain the embodiments of the present application more clearly, a brief introduction regarding the accompanying drawings that need to be used for describing the embodiments of the present application or the prior art is given below; it is obvious that the accompanying drawings described as follows are only some embodiments of the present application, for those skilled in the art, other drawings can also be obtained according to the current drawings on the premise of paying no creative labor.

Figure 1:
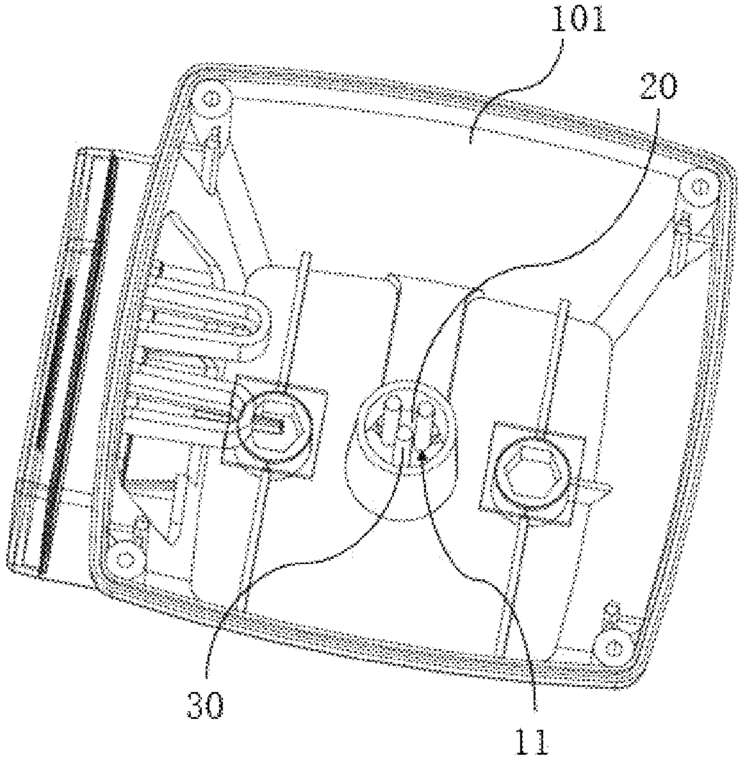
FIG. 1 is a partial structural schematic view of ta lamp shell provided in an embodiment of the present application.

In the drawings, the reference numerals are listed as follows:

10—housing: 101—box body: 102—cover plate: 11—wire-passing channel: 111—first channel; 112—diameter reduction channel: 113—second channel: 12—boss: 121—guide slope: 13—support platform: 131—outer wall: 14—first receiving slot: 15—second receiving slot: 20—waterproof plug: 21—wire-passing hole: 22—notch: 23—protruding edge: 30—wire; and 100—lamp body.

DETAILED DESCRIPTION OF EMBODIMENTS

In order to make the purpose, the technical solution and the advantages of the present application be clearer and more understandable, the present application will be further described in detail below with reference to accompanying figures and embodiments. It should be understood that the specific embodiments described herein are merely intended to illustrate but not to limit the present application.

It is noted that when a component is referred to as being "fixed to" or "disposed on" another component, it can be directly or indirectly on another component. When a component is referred to as being "connected to" another component, it can be directly or indirectly connected to another component.

In the description of the present application, it needs to be understood that, directions or location relationships indicated by terms such as "length", "width", "up", "down", "front", "rear", "left", "right", "vertical", "horizontal", "top", "bottom", "inside", "outside", and so on are the directions or location relationships shown in the accompanying figures, which are only intended to describe the present application conveniently and simplify the description, but not to indicate or imply that an indicated device or component must have specific locations or be constructed and manipulated according to specific locations: therefore, these terms shouldn't be considered as any limitation to the present application.

In addition, terms "the first" and "the second" are only used in describe purposes, and should not be considered as indicating or implying any relative importance, or implicitly indicating the number of indicated technical features. As such, technical feature(s) restricted by "the first" or "the second" can explicitly or implicitly comprise one or more such technical feature(s). In the description of the present application, "a plurality of" means two or more, unless there is additional explicit and specific limitation.

Figure 2:
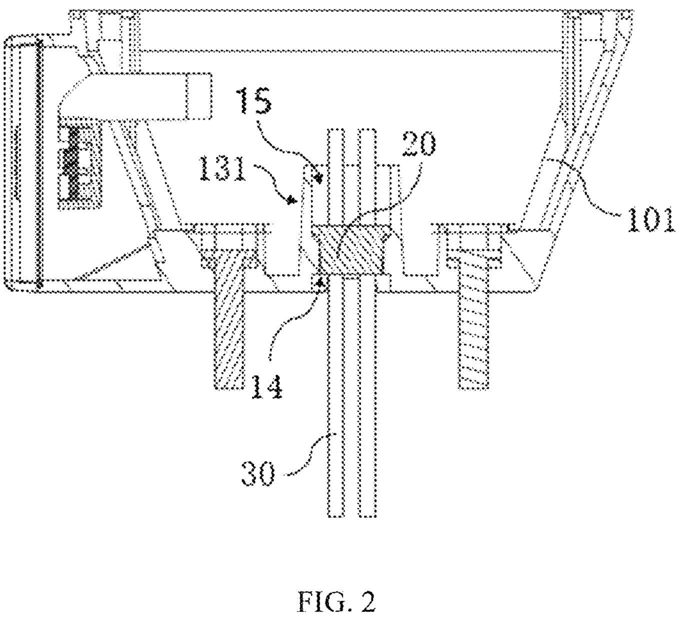
FIG. 2 is a cross-sectional view of a lamp shell provided in tan embodiment of the present application.
Figure 3:
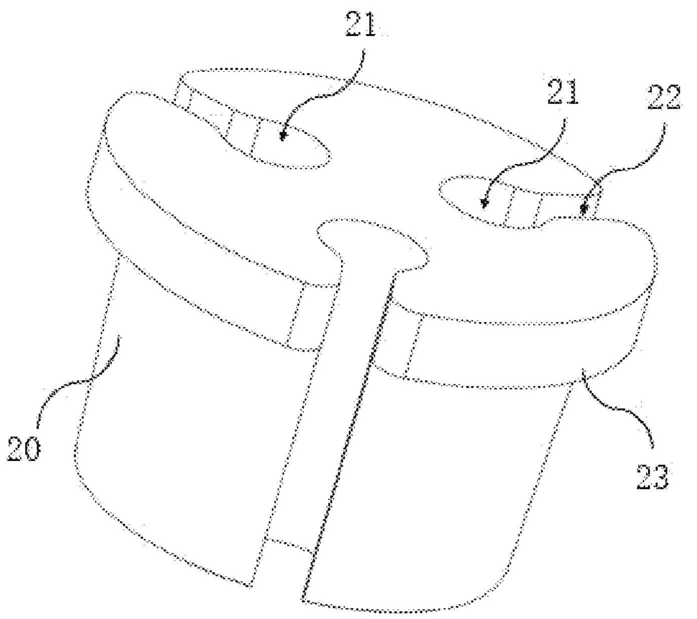
FIG. 3 is a structural schematic view of a waterproof plug provided in an embodiment of the present application.

As shown in FIGS. 1 to 3, the lamp shell provided in the embodiment of the present application will now be described. The lamp shell includes a housing 10 and a waterproof plug 20, the housing 10 is provided with a wire-passing channel 11, and the waterproof plug 20 is plugged and fixed in the wire-passing channel 11. As shown in FIG. 3, the waterproof plug 20 is provided with a wire-passing hole 21 for interference fit with the wire 30, and the wire-passing hole 21 is provided with an notch 22.

The interior of the housing 10 is in a cavity shape, and the interior of the housing 10 is used to install the lamp body 100, the control board and other devices. Specifically, the housing 10 includes a box body 101 and a cover plate 102, and the cover plate 102 covers the open end of the box body 101. In one embodiment, the cover plate 102 is snap-fitted to the box body 101. For example, one of the cover plate 102 and the box body 101 is provided with a snap fastener, and the other is provided with a slot, and the snap fastener is inserted into the slot to fix the cover plate 102 on the box body 101. In another embodiment, the cover plate 102 and the box body 101 are fixedly connected by screws. In order to improve the sealing performance of the housing 10, a sealing ring is installed between the box body 101 and the cover plate 102. The sealing ring is a silicone ring or a rubber ring. In addition, the box body 101 and the cover plate 102 can also be fixedly connected by ultrasonic welding or sealant.

The wire-passing channel 11 is located at the bottom of the box body 101. The waterproof plug 20 is plugged and fixed in the wire-passing channel 11. In one embodiment, the waterproof plug 20 is inserted in the wire-passing channel 11 with interference fit. In another optional embodiment, the waterproof plug 20 is fixedly installed in the wire-passing channel 11 by sealant.

As shown in FIG. 3, the waterproof plug 20 is provided with a wire-passing hole 21, and the wire-passing hole 21 is in a shape of a through hole. The wire 30 is inserted in the wire-passing hole 21, and the diameter of the wire-passing hole 21 is equivalent to the diameter of the wire 30, so that the wire 30 and the waterproof plug 20 are closely fitted to achieve interference fit. For example, the diameter of the wire-passing hole 21 is within 1 mm smaller than the diameter of the wire 30. As shown in FIG. 3, the wire-passing hole 21 is provided with an notch 22, and the notch 22 is communicated to the wire-passing hole 21 and the outside of the waterproof plug 20. The notch 22 penetrates the waterproof plug 20 along the axial direction of the wire-passing hole 21.

During the process of assembling the waterproof plug 20 and the housing 10, when the wire 30 is inserted into the wire-passing hole 21, the hole wall of the wire-passing hole 21 is squeezed and the notch 22 is expanded, so that the wire 30 can pass through conveniently with the help of the deformation space provided by the notch 22 and the hole wall of the wire-passing hole 21 can be effectively fitted with the wire 30. When the waterproof plug 20 is inserted into the wire-passing channel 11, the deformation space provided by the notch 22 facilitates the contraction of the waterproof plug 20 so that the waterproof plug 20 fits the inner wall of the wire-passing channel 11 to achieve an interference fit.

Compared with the prior art, the lamp shell provided by the present application is provided with the notch 22 on the wire-passing hole 21. By arranging the notch 22, the wire-passing hole 21 has a larger elastic deformation space for installing the wire 30. Moreover, when the waterproof plug 20 is installed in the wire passing channel 11, the notch 22 is compressed, so that the waterproof plug 20 can better adapt to the dimensional deviation of the wire passing channel 11 to ensure a tight fit: after being installed in place, the waterproof plug 20 is pressurized, and a greater rebound force is generated with the help of the set notch 22, so that the gap between the outer wall of the waterproof plug 20 and the inner wall of the waterproof wire passing channel 11 can be filled more tightly to prevent the ingress of water, dust, etc., therefore the sealing effect of the waterproof plug 20 is improved.

In another embodiment of the present application, the waterproof plug 20 is in the shape of a truncated cone, and correspondingly, the wire-passing channel 11 is a circular hole. By arranging the waterproof plug 20 in the shape of a truncated cone, which is convenient to insert the waterproof plug 20 into the wire-passing channel 11 and at the same time facilitate the demolding of the waterproof plug 20 during production. Specifically, the waterproof plug 20 is a conical frustum shape, and the sizes of the two ends are unequal. Correspondingly, the wire-passing channel 11 can be a circular hole with a gradually changing aperture or a circular hole with a uniform aperture, as long as it is ensured that the waterproof plug 20 can be inserted into the wire-passing channel 11 and have an interference fit with the housing 10.

Figure 4:
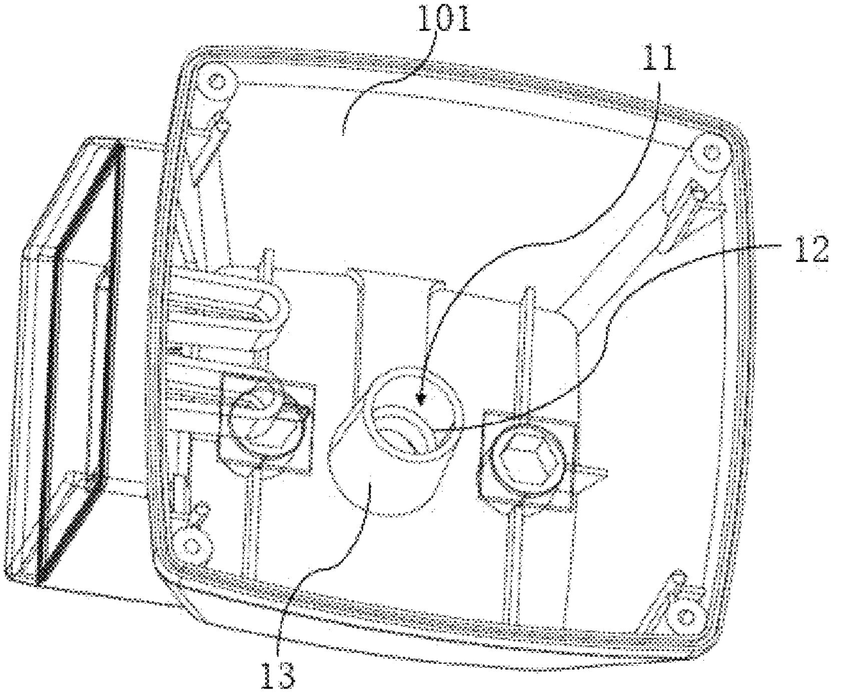
FIG. 4 is a partial structural schematic view of a housing provided in an embodiment of the present application.
Figure 5:
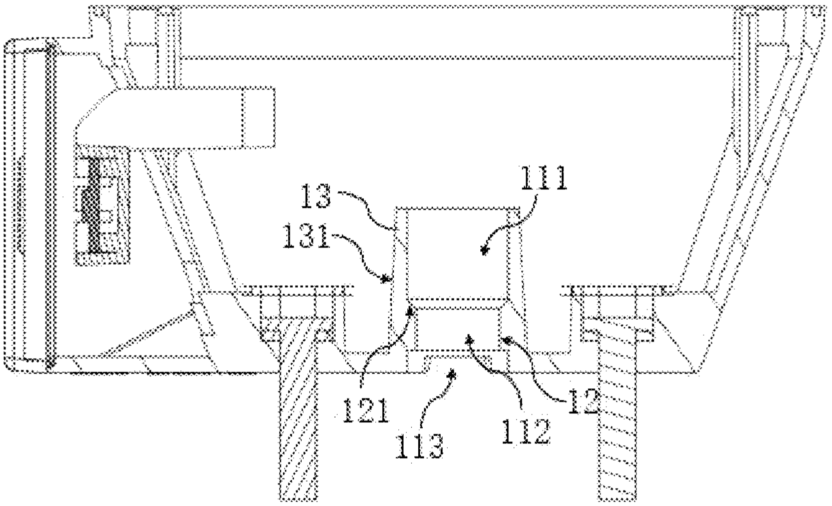
FIG. 5 is a cross-sectional view of a housing used in an embodiment of the present application.

In another embodiment of the present application, as shown in FIGS. 3, 4 and 5, the waterproof plug 20 is provided with a protruding edge 23, and a boss 12 is convexly provided on the inner wall of the wire-passing channel 11, and the protruding edge 23 is lapped at the inner end face of the boss 12. By providing the boss 12 and the protruding edge 23, positioning support is provided for the position where the waterproof plug 20 is inserted into the wire-passing channel 11, therefore the installation convenience of the waterproof plug 20 is improved. The inner end surface of the boss 12 refers to the end of the boss 12 close to the housing 10.

Optionally, the protruding edge 23 is annular and is arranged around the circumference of the waterproof plug 20. Optionally, the protruding edge 23 includes a plurality of lugs arranged at intervals along the circumference of the waterproof plug 20. The protruding edge 23 forms the waterproof plug 20 into a first connecting section and a second connecting section connected in sequence. The cross-sectional area of the first connecting section is greater than the cross-sectional area of the second connecting section. The cross-sections of the first connecting section and the second connecting section refer to the cross-sections of the first connecting section and the second connecting section obtained by a plane perpendicular to the hole axis direction of the wire-passing hole 21.

The boss 12 is convexly arranged on the inner wall of the wire channel 11 and is arranged around the circumference of the wire channel 11. Similarly, the boss 12 is arranged around the circumference of the wire channel 11 or includes a plurality of protrusions distributed at intervals along the circumference of the wire channel 11. The boss 12 forms a diameter reduction area in the wire channel 11. As shown in FIG. 5, the boss 12 forms the first channel 111, the diameter reduction channel 112 and the second channel 113 connected in sequence in the wire-passing channel 11.

The axial length of the boss 12 along the wire-passing channel 11 is the same as the length of the second connecting section: alternatively, the axial length of the boss 12 along the wire-passing channel 11 is slightly greater than the length of the second connecting section. The length of the second connecting section is such that after the waterproof plug 20 is inserted into the wire-passing channel 11, the end of the waterproof plug 20 away from the protruding edge 23 does not exceed the boss 12. At this time, one end of the waterproof plug 20 is located in the first channel 111, and the other end of the waterproof plug 20 is located in the diameter reduction channel 112. The axial length of the boss 12 along the wire-passing channel 11 can also be less than the length of the second connecting section, so that one end of the waterproof plug 20 is located in the first channel 111, and the other end is located in the second channel 113.

In another embodiment of the present application, as shown in FIG. 5, the inner side end of the boss 12 is provided with a guide slope 121, and the angle formed between the guide slope 121 and the axis of the wire-passing channel 11 is ranged from 30° to 60°. Specifically, the guide slope 121 is used to guide the second connecting section of the waterproof plug 20 to be inserted into the diameter reduction channel 112. The angle between the guide slope 121 and the axis of the wire-passing channel 11 is 30° or 60°, or any angle between 30° and 60°. Optionally, the angle formed between the guide slope 121 and the axis of the wire-passing channel 11 is ranged from 40° to 50°. For example, the angle formed between the guide slope 121 and the axis of the wire-passing channel 11 is 40°, 45° or 50°. By providing the guide slope 121 on the boss 12, it is convenient to fix the waterproof plug 20 and at the same time facilitate the boss 12 not to shrink and deform when demolding.

In another embodiment of the present application, the width of the notch 22 is not greater than ⅓ of the diameter of the wire-passing hole 21. In a case that the width of the notch 22 is too large, it will affect the sealing of the waterproof plug 20. For this reason, the width of the notch 22 can be ⅓, ¼ or ⅕ of the diameter of the wire-passing hole 21, as long as it is not greater than ⅓ of the diameter of the wire-passing hole 21.

In another embodiment of the present application, as shown in FIG. 2, the wall surface of the wire-passing channel 11 and the end surface of the waterproof plug 20 form a receiving slot, and two receiving slots are provided, and at least one of the receiving slots is provided with a waterproof seal.

After the waterproof plug 20 is inserted into the wire-passing channel 11, the wall surface of the second channel 113 and the end surface of the waterproof plug 20 away from the protruding edge 23 form a first receiving slot 14. The wall surface of the first channel 111 and the end surface of the waterproof plug 20 with a protruding edge 23 form a second receiving slot 15, therefore the first receiving slot 14 and the second receiving slot 15 are formed on the side of the boss 12 close to the inside of the housing 10 and the side of the boss 12 close to the outside of the housing 10, respectively, and at least one of the first receiving slot 14 and the second receiving slot 15 is installed with the waterproof seal. For example, in some embodiments only the first receiving slot 14 close to the outside of the housing 10 is filled with sealant to form the waterproof seal. When the wire 30 and the waterproof plug 20 are installed in place, the first receiving slot 14 is located outside the housing 10, which is convenient for pouring sealant into the first receiving slot 14 for sealing, and the operation is convenient. For another example, before the housing 10 is packaged, the second receiving slot 15 close to the inside of the housing 10 is filled with sealant to form the waterproof seal, which can also improve the waterproof performance. Sealant can also be filled in both the first receiving slot 14 and the second receiving slot 15 to improve the waterproof performance and strengthen the connection firmness between the waterproof plug 20 and the housing 10.

Optionally, the waterproof seal is a sealant. During assembly, the sealant is poured into the first receiving slot 14 and/or into the second receiving slot 15 to form the waterproof seal to seal the wire-passing channel 11. The lateral dimensions of the receiving slot 14 and the second receiving slot 15 are equal to the maximum cross-section of the waterproof plug 20, so that the sealant can be retained when the sealant is poured to seal the wire-passing channel 11, and the sealant can be prevented from leaking out and reducing the sealing effect. As a result, when the wire is threaded and plugged into the wire-passing channel 11, the waterproof plug 20 can fit the wall of the wire-passing channel 11 more closely, and prevent the relative sliding between the wire 30 and the waterproof plug 20, as well as the waterproof plug 20 and the housing 10, so as to prevent the sealant from losing its waterproof performance due to the gap caused by the relative sliding.

In another embodiment of the present application, as shown in FIGS. 4 and 5, a support platform 13 is convexly provided inside the housing 10, and the wire-passing channel 11 passes through the support platform 13. The support platform 13 is located at the bottom of the box body 101. The support platform 13 is used to improve the strength of the housing 10 at the wire-passing channel 11, and can provide an installation position for the waterproof plug 20. The outer wall 131 of the support platform 13 is tapered. Since the outer wall 131 of the support platform 13 is inclined relative to the axis of the wire-passing channel 11, it is convenient to demold the box body 101 when it is manufactured.

In another embodiment of the present application, the inclination angle between the outer wall 131 of the support platform 13 and the axis of the wire-passing channel 11 is ranged from 1° to 5°. For example, the angle formed between the outer wall 131 of the support platform 13 and the axis of the wire-passing channel 11 is 1°, 5° or any angle value between 1° and 5°. For example, the angle formed between the outer wall 131 of the support platform 13 and the axis of the wire-passing channel 11 is 3°.

In another embodiment of the present application, a plurality of wire-passing holes 21 are provided, and at least some of the wire-passing holes 21 are provided with the notch 22. For example, each wire-passing hole 21 is provided with an notch 22: or, some of the plurality of wire-passing holes 21 are provided with the notches 22, and other parts are not provided with the notches 22. As shown in FIG. 3, three wire-passing holes 21 are provided, the three wire-passing holes 21 are arranged in a triangular shape, and each wire-passing hole 21 is provided with an notch 22. In addition, two or four wire-passing holes 21 can also be provided, which are specifically designed according to the actual number of wires.

In another embodiment of the present application, as shown in FIGS. 1 to 3, the height of the waterproof plug 20 is ranged from 1 mm to 30 mm. The height of the waterproof plug 20 refers to the maximum length of the waterproof plug 20 along the axial direction of the wire-passing hole 21. Specifically, the height of the waterproof plug 20 can be 1 mm, 3 mm, 10 mm, 30 mm, and any value between 1 mm and 30 mm.

Optionally, the height of the waterproof plug 20 is ranged from 8 mm to 12 mm. For example, the height of the waterproof plug 20 is 8 mm, 10 mm, and 12 mm. The height of the waterproof plug 20 can also be any value between 8 mm and 12 mm, and this embodiment of the present application is not specifically limited to this. By limiting the height of the waterproof plug 20, the height of the waterproof plug 20 is appropriate, which can not only provide support and guidance for the wire 30, but also ensure that the lamp shell has a good sealing effect, prevent moisture, humidity and dust from entering the housing 10 to affect the electrical connection structure in the housing 10, and the risk of short circuit is reduced.

In another embodiment of the present application, the waterproof plug 20 is made of an elastic material, and the waterproof plug 20 is installed in the wire-passing channel 11 and the interference fit with the wire 30 is achieved by means of the elasticity of the waterproof plug 20. Optionally, the waterproof plug 20 is a silicone member or a rubber member.

Figure 6:
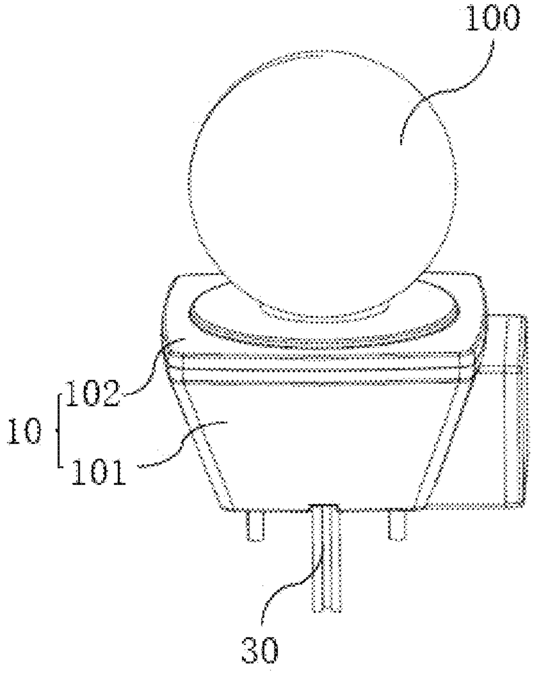
FIG. 6 is a partial structural schematic view of a lamp provided in n embodiment of the present application.

The present application also provides a lamp, as shown in FIG. 6, the lamp includes a lamp body 100 and the lamp shell as described above, and the lamp body 100 is installed in the housing 10. The wire 30 of the lamp body 100 is located in the wire-passing hole 21.

The lamp is an appliance for providing lighting for household lighting, automotive lamps, etc. The lamp body 100 is connected to the control board, the control board is connected to the wire 30, and the wire 30 passes through the wire-passing hole 21 of the waterproof plug 20. The lamp body 100 is installed on the cover plate 102 of the housing 10 and is electrically connected to the control board. The lamp body 100 can be installed inside the housing 10 or outside the housing 10. For example, as shown in FIG. 6, the lamp body 100 is located outside the housing 10.

In the lamp provided in the present application, the wire-passing hole 21 of the waterproof plug 20 is provided with an notch 22, so that the wire-passing hole 21 has a larger elastic space, which is convenient for threading the wire 30 and installing the waterproof plug 20 in the wire-passing channel 11. With the elasticity of the wire-passing hole 12, the waterproof plug 20 is fully fitted with the inner wall of the wire-passing channel 11, therefore the sealing effect of the waterproof plug 20 is improved.

The lamp provided in the embodiment of the present application is subjected to IP67 waterproof test and wire pulling verification. Taking the lamp as a 3.0 W vehicle taillight as an example, two 3.0 W vehicle taillights are selected as test samples. The test standard is IEC 60529, which requires: in a laboratory with an ambient temperature of 25° C., the test sample is completely immersed in a container filled with water, the lowest point of the test sample is ≥1 m from the water surface and the highest point of the test sample is ≥0.15 m from the water surface, and the immersion time is 30 minutes. After the immersion, the test sample is taken out, and no water is allowed to enter the test sample.

Before the IP67 waterproof test, two vehicle taillights are tested separately using an adjustable DC power supply to detect the power values of each. Under the condition of a DC constant voltage of 12V, both are turned on normally: the power test value of test sample 1 is 3.0 W, and the power test value of test sample 2 is 3.1 W.

Then, the IP67 waterproof test was carried out. In a laboratory with an ambient temperature of 25° C., two test samples were tied together with a weight and sunk into a 1 m deep water tank filled with water. The lowest point of the two test samples was 1 m from the water surface, and the highest point was 0.91 m from the water surface. The immersion time was 30 minutes. Then take them out for visual observation to check that there were no water stains in the vehicle taillights. Use an adjustable DC power supply to test the two vehicle taillights separately. Under the condition of a DC constant voltage of 12V, both were turned on normally without short circuit. The power test value of the test sample 1 was 3.0 W, and the power test value of the test sample 2 was 3.1 W, which are consistent with the test value before the IP67 waterproof test.

It is determined that the two test samples passed the test, met the IP67 waterproof test requirements in the IEC 60529 standard, and met the product use requirements.

The aforementioned embodiments are only preferred embodiments of the present application, and should not be regarded as being limitation to the present application. Any modification, equivalent replacement, improvement, and so on, which are made within the spirit and the principle of the present application, should be included in the protection scope of the present application.

What is claimed is:

1. A lamp shell, comprising:

a housing (10), provided with a wire-passing channel (11); and a waterproof plug (20), plugged and fixed in the wire-passing channel (11);

wherein the waterproof plug (20) is provided with a wire-passing hole (21) configured for interference fit with a wire (30), and the wire-passing hole (21) is provided with a notch (22) located on an outside wall of the waterproof plug (20);

wherein a width of the notch (22) is not greater than ⅓ of a diameter of the wire-passing hole (21); and wherein when the waterproof plug (20) is inserted into the wire-passing channel (11), a deformation space provided by the notch (22 facilitates contracting of the waterproof plug (20), so that the waterproof plug (20) fits an inner wall of the wire-passing channel (11) to achieve an interference fit.

2. The lamp shell according to claim 1, wherein the waterproof plug (20) is provided with a protruding edge (23), an inner wall of the wire-passing channel (11) is provided with a boss (12), and the protruding edge (23) is lapped at an inner side end of the boss (12) an end of the boss (12) closest to an interior of the housing (10).

3. The lamp shell according to claim 2, wherein the end of the boss (12) closest to the interior of the housing (10) is provided with a guide slope (121), and an angle formed between the guide slope (121) and an axis of the wire-passing channel (11) is ranged from 30° to 60°.

4. The lamp shell according to claim 1, wherein a wall surface of the wire-passing channel (11) and an end surface of the waterproof plug (20) form a receiving slot (14), two receiving slots (14) are provided, and at least one of the receiving slots (14) is provided with a waterproof seal.

5. The lamp shell according to claim 1, wherein an inner wall of the housing (10) is provided with a support platform (13), the wire-passing channel (11) passes through the support platform (13), and an outer wall (131) of the support platform (13) is tapered.

6. The lamp shell according to claim 5, wherein an angle formed between the outer wall of the support platform (13) and an axis of the wire-passing channel (11) is ranged from 1° to 5°.

7. The lamp shell according to claim 1, wherein a height of the waterproof plug (20) is ranged from 1 mm to 30 mm.

8. The lamp shell according to claim 1, wherein the waterproof plug (20) is a silicone member or a rubber member.

9. A lamp, comprising a lamp body (100) and a lamp shell comprising:

a housing (10), provided with a wire-passing channel (11); and a waterproof plug (20), plugged and fixed in the wire-passing channel (11);

wherein the waterproof plug (20) is provided with a wire-passing hole (21) configured for interference fit with a wire (30), and the wire-passing hole (21) is provided with a notch (22) located on an outside wall of the waterproof plug (20); and wherein a width of the notch (22) is not greater than ⅓ of a diameter of the wire-passing hole (21);

wherein when the waterproof plug (20) is inserted into the wire-passing channel (11), a deformation space provided by the notch (22 facilitates contracting of the waterproof plug (20), so that the waterproof plug (20) fits an inner wall of the wire-passing channel (11) to achieve an interference fit; and wherein the lamp body (100) is installed in the housing (10), and the wire (30) of the lamp body (100) is located in the wire-passing hole (21).

10. The lamp according to claim 9, wherein the waterproof plug (20) is provided with a protruding edge (23), an inner wall of the wire-passing channel (11) is provided with a boss (12), and the protruding edge (23) is lapped at an inner side end of the boss (12) an end of the boss (12) closest to an interior of the housing (10).

11. The lamp according to claim 10, wherein the inner side end of the boss (12) closest to the interior of the housing (10) is provided with a guide slope (121), and an angle formed between the guide slope (121) and an axis of the wire-passing channel (11) is ranged from 30° to 60°.

12. The lamp according to claim 9, wherein a wall surface of the wire-passing channel (11) and an end surface of the waterproof plug (20) form a receiving slot (14), two receiving slots (14) are provided, and at least one of the receiving slots (14) is provided with a waterproof seal.

13. The lamp according to claim 9, wherein an inner wall of the housing (10) is provided with a support platform (13), the wire-passing channel (11) passes through the support platform (13), and an outer wall (131) of the support platform (13) is tapered.

14. The lamp according to claim 13, wherein an angle formed between the outer wall of the support platform (13) and an axis of the wire-passing channel (11) is ranged from 1° to 5°.

15. The lamp according to claim 9, wherein a height of the waterproof plug (20) is ranged from 1 mm to 30 mm.

16. The lamp according to claim 9, wherein the waterproof plug (20) is a silicone member or a rubber member.

* * * * *